United States Patent
Voto et al.

(10) Patent No.: US 6,286,221 B1
(45) Date of Patent: Sep. 11, 2001

(54) SYSTEM USING MAGNETIC SIGNATURES TO DETECT A VEHICLE EVENT

(75) Inventors: Andrew Michael Voto, Swartz Creek; Ronald Kenneth Selby, Flint; Paul Thaddeus Glomski, Fenton, all of MI (US); Maurice Lydell Dantzler, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/482,043

(22) Filed: Jan. 13, 2000

(51) Int. Cl.[7] ..................................................... G01C 17/38
(52) U.S. Cl. ................ 33/356; 33/357; 33/600; 702/92
(58) Field of Search ..................... 33/356, 600, 355 R, 33/357; 702/92, 93

(56) References Cited

U.S. PATENT DOCUMENTS

| | | | |
|---|---|---|---|
| 4,953,305 | 9/1990 | Van Lente et al. | 33/356 |
| 5,511,319 | 4/1996 | Geerlings et al. | 33/356 |
| 5,664,335 | 9/1997 | Sunan et al. | 33/356 |
| 5,761,094 * | 6/1998 | Olson et al. | 33/356 |
| 6,192,315 * | 2/2001 | Geschke et al. | 702/92 |

* cited by examiner

Primary Examiner—Christopher W. Fulton
(74) Attorney, Agent, or Firm—Jimmy L. Funke

(57) ABSTRACT

An electronic compass system using magnetic signatures to detect a vehicle event which is integrated with an instrument cluster. A vehicle accessory, such as a rear defrost grid, generates a known, consistent, magnetic field of intensity sufficient to cause a static magnetic offset in the electronic compass for each of its' electrical states. This known consistent, magnetic field has a magnetic signature. A magnetic field sensor detects a combination of Earth's magnetic field and the stray magnetic field produced by the vehicle accessory. A controller is coupled to the magnetic field sensor and searches the magnetic field signal for the magnetic signature. The controller then looks up a predetermined correction factor, or uses an algorithm to determine a correction factor, corresponding to the magnetic signature, to eliminate the effect of the static magnetic offset. The controller then displays a heading unaffected by the static magnetic offset.

15 Claims, 2 Drawing Sheets

SYSTEM USING MAGNETIC SIGNATURES TO DETECT A VEHICLE EVENT

TECHNICAL FIELD

The present invention relates generally to magnetic direction sensing systems and more particularly, to a system using magnetic signatures to detect a vehicle event.

BACKGROUND ART

U.S. Pat. No. 4,953,305 discloses an electrical compass system for use in a vehicle in which a magnetic sensor, such as a flux-gate sensor, is employed in connection with a microprocessor to provide a digital display of the vehicle heading. The system described in the '305 patent provides continuous automatic calibration of the compass to correct for changes in the detected magnetic field due to the vehicle's magnetism and changes thereto. The system described in the '305 patent also provides a system which, in effect, filters out magnetic aberrations caused by travel within an area where severe electromagnetic interference may temporarily occur.

In addition to the external magnetic disturbance that may affect the accuracy of display of compass headings, changes in the vehicle's magnetic field can also cause erroneous displays. One such problem is the type encountered when the compass sensor must be mounted in the instrument panel and the vehicle's HVAC system is activated. The fan motor draws significant current and, as the fan speed is varied drawing different amounts of current, the magnetic field caused by the current supplied to the fan motor can adversely affect the accuracy of the compass display. In order to correct for such a problem, the compensation system disclosed in U.S. Pat. No. 5,511,319 was developed. In this system, correction signals are provided to the compass circuit in response to sensed fan motor speed settings to continuously provide accurate heading information regardless of the fan speed setting.

Regardless of the mounting position of the compass sensor, the vehicle's magnetism can also be affected when, for example, a vehicle door is opened. Typically, when the vehicle is underway, the doors are always closed. When the vehicle stops, however, and the driver or passenger opens a door, the change in vehicle magnetism due to the movement of the door from a closed to an open position frequently will cause the compass heading to change even though the vehicle is stationary. U.S. Pat. No. 5,664,335 addresses this problem by using a door position detector circuit coupled to a microprocessor employed within the compass system. The compass system locks the compass display at the heading displayed just prior to opening of the vehicle door when the vehicle is not in operation.

Unfortunately, the systems that are disclosed in these patents have several drawbacks. U.S. Pat. No. 5,511,319 requires additional hardware, which increases overall system cost and complexity while reducing overall system reliability. U.S. Pat No. 5,664,335 requires that the vehicle be stationary during the operation of the invention.

Accordingly, there is a need to correct for this magnetic noise during vehicle operation without requiring additional hardware. The system of the present invention provides an improved compass circuit and software that meets this objective.

SUMMARY OF THE INVENTION

It is, therefore, an object of the invention to provide an improved and reliable means using magnetic signatures to detect a vehicle event. Another object of the invention is to reduce weight and cost and improve reliability by eliminating the need for additional hardware.

In one aspect of the invention, an electronic compass includes a device using magnetic signatures to detect a vehicle event, which is integrated with an instrument cluster. A vehicle accessory, such as a rear defrost grid, generates a known, consistent, magnetic field of intensity sufficient to cause a static magnetic offset in the electronic compass for the various electrical states. This known consistent, magnetic field has a magnetic signature. A magnetic field sensor detects a combination of Earth's magnetic field and the stray magnetic field produced by the vehicle accessory. A controller is coupled to the magnetic field sensor and searches the magnetic field signal for the magnetic signature. The controller then looks up a predetermined correction factor, or uses an algorithm to determine a correction factor, corresponding to the magnetic signature, to eliminate the effect of the static magnetic offset. The controller then displays a heading unaffected by the static magnetic offset.

The present invention achieves an improved and reliable means using magnetic signatures to detect a vehicle event. An advantage of the present invention is that it achieves this goal without the need for additional hardware, thus improving reliability while reducing cost and weight.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODE(S) FOR CARRYING OUT THE INVENTION

Figure 1:
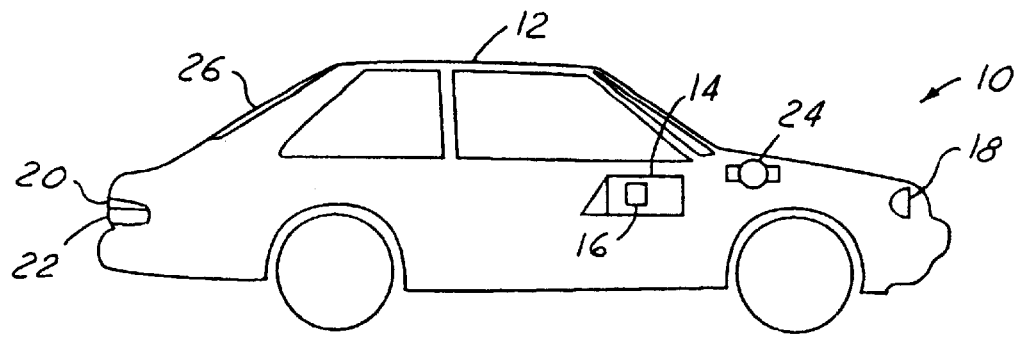
FIG. 1 illustrates a vehicle incorporating an electronic compass system in accordance with one embodiment of the present invention.

Referring to FIG. 1, an illustration of a vehicle 12 incorporating an electronic compass system 10 in accordance with one embodiment of the present invention is shown. Electronic compass system 10 has an instrument cluster 14 located in an instrument panel (not shown). In the present invention, an electronic compass 16 having a device for eliminating magnetic noise is integrated in instrument cluster 14. Vehicle 12 also includes many vehicle accessories, such as headlamps 18, tail lamps 20, stop lamps 22, wiper motor 24 and rear defrost grid 26.

Figure 2:
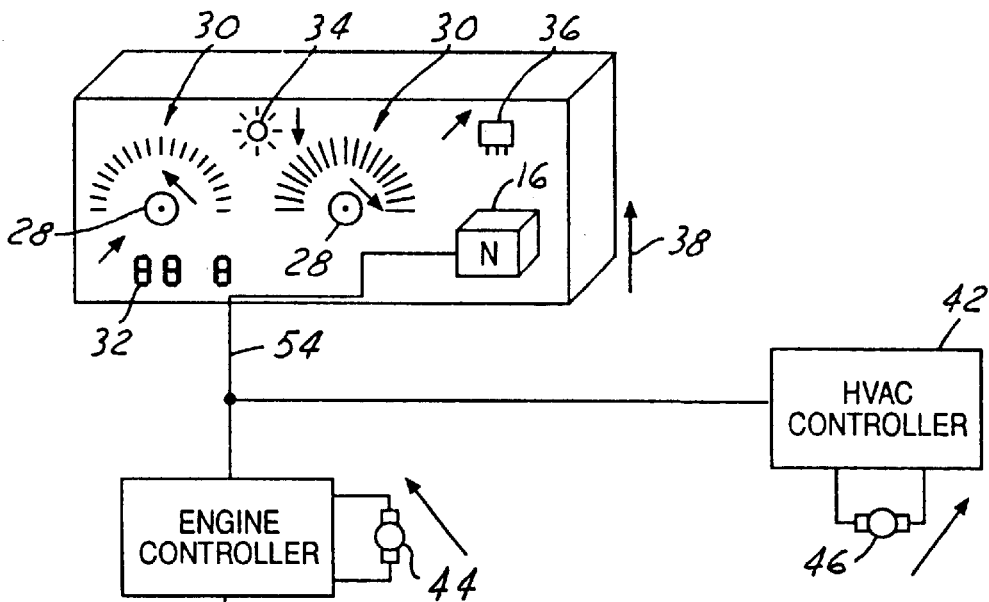
FIG. 2 is a block diagram of an instrument cluster and related electronics in accordance with one embodiment of the present invention.

Referring to FIG. 2, a block diagram of an instrument cluster 14 and related electronics in accordance with one embodiment of the present invention is illustrated. Instrument cluster 14 includes several additional vehicle accessories. These vehicle accessories include, for example, an integrated electronic compass 16, stepper motors 28 (for driving various gauges 30), vacuum fluorescent displays 32 (for displaying information), indicator lamps 34 (for turn signals, oil pressure, airbag, etc.), and can relays 36 (to drive loads such as turn signals and hazard lights).

Each vehicle accessory has one or more electrical states. In the present invention, for example, indicator lamp 34 has two possible states, "off" and "on", while stepper motor 28 has twenty-four possible different electrical states, referred to as microsteps. For each state, the vehicle accessory produces a known, consistent, magnetic field. An associated arrow next to each vehicle accessory shows the direction of each magnetic field of the accessories. The direction of the Earth's magnetic field 38 is also depicted. Each magnetic field is measured by electronic compass 16 as static magnetic offset. In the present invention, stepper motor 28 generates a known, consistent, magnetic field for all twenty-four electrical states, resulting in electronic compass 16 measuring twenty-four static magnetic offsets.

Figure 3:
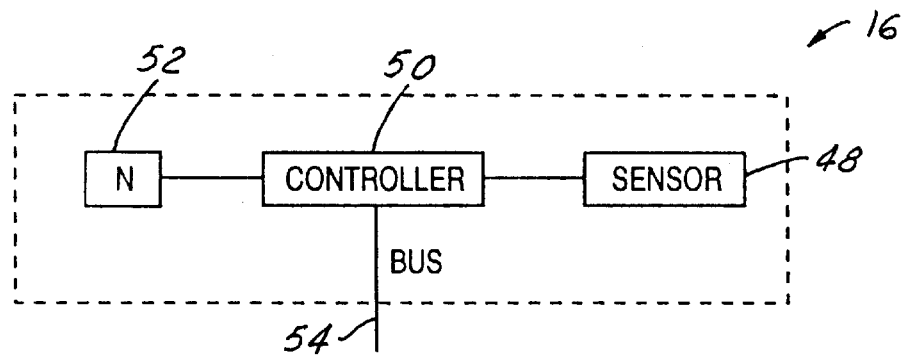
FIG. 3 is a block diagram of an electronic compass having a device for eliminating- magnetic noise in accordance with one embodiment of the present invention.

Referring to FIG. 3, a block diagram of an electronic compass 16 having a device for eliminating magnetic noise in accordance with one embodiment of the present invention is illustrated. In the present invention, electronic compass 16 is integrated in instrument cluster 14. Electronic compass 16 includes a magnetic field sensor 48, a controller 50 and a display 52.

Magnetic field sensor 48 is located in proximity to one or more of the above vehicle accessories and is coupled to controller 50. Magnetic field sensor 48 detects a combination of The Earth's magnetic field 38 and one or more of the vehicle accessory magnetic fields and generates a corresponding magnetic field signal. The direction of the magnetic field detected by magnetic field sensor 48 is different than the direction of The Earth's magnetic field 38. This is due to the static magnetic offset caused by the known, consistent magnetic fields generated by the vehicle accessories, which modifies The Earth's magnetic field.

The proximity of magnetic field sensor 48 to any given vehicle accessory can be optimized to minimize the static magnetic offset caused by the vehicle accessory. In the present invention, for example, the magnetic fields generated by stepper motor 28 depend not only on the current microstep, but also on the location around motor 28 where the magnetic field is measured. Specifically, the magnitude of the field changes as it is measured in a circle around motor 28. The magnitude of the field also decreases as the measurement point is moved away from motor 28. Therefore, after all the locations of stepper motor 28 within instrument cluster 14 have been identified, the location of magnetic field sensor 48 and the rotation of all of the stepper motors 28 at their location may be optimized to minimize their effect on electronic compass 16.

Controller 50 is coupled to magnetic field sensor 48 and receives the magnetic field signal. In the present embodiment, controller 50 is also coupled to one or more electronic controllers through communications bus 54. Controller 50 has control logic operative to command each vehicle accessory located in instrument cluster 14 to change electrical states. Therefore, by knowing the current vehicle accessory electrical state, and the associated static magnetic offset, the effects of the vehicle accessory can be eliminated by software correction. Controller 50 looks up a predetermined correction factor for each electrical state of each vehicle accessory, stored in a memory location (such as EEPROM), and applies the predetermined correction factor to the magnetic field signal. Controller 50 knows what field the vehicle accessory produces for whatever electrical state the vehicle accessory happens to be in, and subtracts the field from the data collected.

Display 52 is coupled to and controlled by controller 50. Display 52 is responsible for displaying the Earth's magnetic field heading unaffected by any magnetic noise (static magnetic offset).

With the present invention the static magnetic offsets may change due to variations in the vehicle accessories and as the temperature changes. Therefore, an automatic calibrating procedure can be performed to determine the offsets for the particular vehicle accessory and operating temperature. The procedure begins by determining a maximum positive magnetic offset by commanding the vehicle accessory to the electrical state that generates the largest positive magnetic offset and detecting the magnetic field. This process is then repeated for the maximum negative magnetic offset. Finally, both the maximum positive and negative magnetic offsets are then used to scale a set of offsets for all of the vehicle accessory electrical states, taken at a known temperature and vehicle accessory variance. These scaled sets of offsets are stored in a memory location, such as EEPROM, located in controller 50.

In another implementation of the current invention, an electronic compass 16 includes a device using information on a communications bus 54 to remove magnetic noise caused by vehicle accessories. Referring again to FIG. 2, instrument cluster 14 is also coupled through a communications bus 54 to one or more electronic controllers. The electronic controllers include, but are not limited to, an engine controller 40 and an HVAC controller 42. Engine controller 40 and HVAC controller 42 control a plurality of vehicle accessories. For example, engine controller 40 controls an engine fan 44, while HVAC controller 42 controls a blower motor 46.

Communications bus 54 informs all coupled electronic modules, including instrument cluster 14, when a vehicle event occurs. These vehicle events include, for example, turning on blower motor 46, turning on engine fan 44, or toggling the power door locks. Each of these vehicle events interferes with electronic compass 16 in a known way. By listening for vehicle event messages on communications bus 54, controller 50 uses this information to prevent the effects that the event has on the electronic compass 16.

For example, when HVAC controller commands blower motor 46 to change electrical states, from "off" to "on", a magnetic field is produced that disrupts the magnetic field sensor measurements. However, HVAC controller 42 also sends a vehicle event message over communications bus 54 that blower motor 46 has been turned on. Therefore controller 50 knows that blower motor 46 has been turned on and that it is affecting magnetic field sensor 48. Controller 50 responds by subtracting the known, consistent magnetic field produced by the fan from the magnetic field signal generated by the magnetic field sensor.

In another implementation of the current invention, an electronic compass 16 includes a device using magnetic signatures to detect a vehicle event. In most cases, not all possible vehicle events are reported on communications bus 54. In this instance, the magnetic field signal generated by magnetic field sensor 48 could be searched in real time by controller 50 for a signature of the event. For example, rear defrost grid 26 may produce a static magnetic field when it is on. The magnetic fields caused by rear defrost grid changing electrical states; from "off" to "on", occurs in a very short period of time, resulting in a very fast change in magnetic offset. In contrast, normal movement of vehicle 12 results in a smooth change in magnetic field over time. By detecting this signature, controller 50 can subtract the offset from any future data taken with the rear defrost grid 26 on, and can eliminate the effects of the defogger. This is done without any direct information that the defogger has been turned on. Obviously, one skilled in the art could apply this process relative to the various different vehicle accessories that are not described here.

Figure 4A:
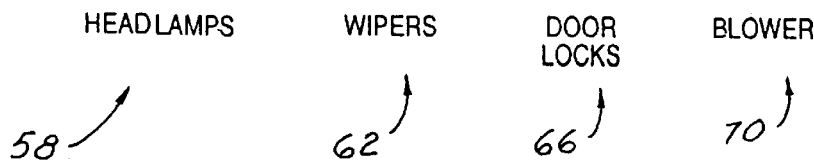
FIGS. 4A and 4B are graphs illustrating the improvements in the magnetic signatures of various vehicle events in accordance with one embodiment of the present invention.
Figure 4B:
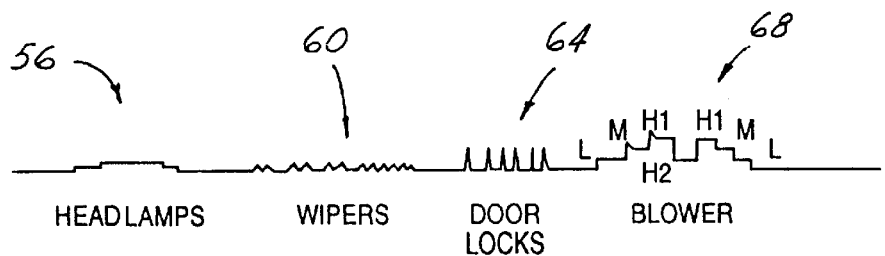

The effects of this process are shown in FIGS. 4A and 4B, graphs illustrating the improvements in the magnetic signatures of various vehicle events in accordance with one embodiment of the present invention. The graphs display the magnetic field intensity over time of various vehicle accessories, with FIG. 4B depicting uncompensated values and FIG. 4A depicting the same accessories with use of the present invention. The companion magnetic signatures shown include headlamp magnetic signature without invention 56 and with invention 58, wiper magnetic signature without invention 60 and with invention 62, door lock actuation magnetic signature without invention 64 and with invention 66, and blower motor magnetic signature without invention 68 and with invention 70.

Figure 5:
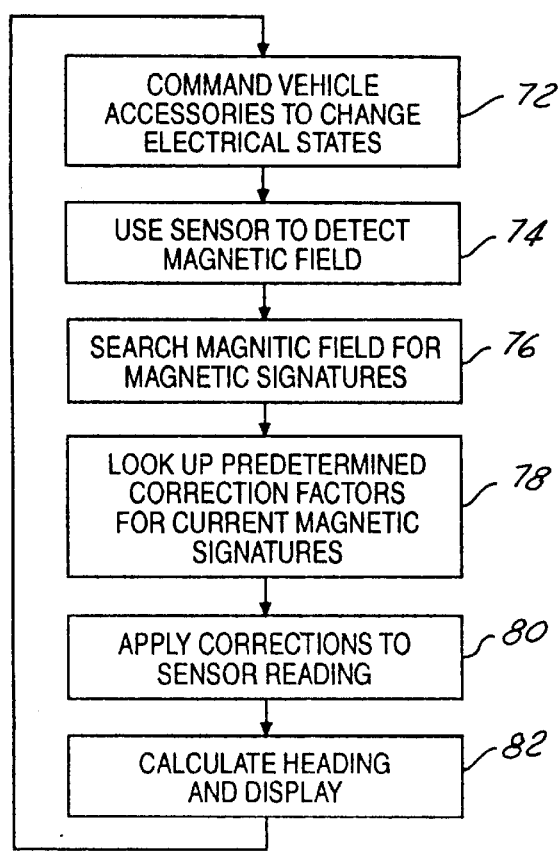
FIG. 5 is a flow chart of a method for eliminating magnetic noise in accordance with one embodiment of the present invention.

Referring to FIG. 5, a flow chart of a method for eliminating magnetic noise in accordance with one embodiment of the present invention is illustrated. In operation, a vehicle operator commands one or more vehicle accessories to change electrical states in step 72. Controller 50 then uses magnetic field sensor 40 to detect the current magnetic field in step 74. After detecting the current magnetic field, controller 50 searches the magnetic field for magnetic signatures in step 76. Controller 50 then looks up a predetermined correction factor for the current magnetic signatures in step 78. Controller 50 then applies the correction factor to the compass heading (in step 80) and displays the heading in step 82.

From the foregoing, it can be seen that there has been brought to the art a new and improved system for using magnetic signatures to detect a vehicle event. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. An electronic compass system using magnetic signatures to detect a vehicle event comprising:

a vehicle accessory having at least one electrical state, said vehicle accessory generating a known, consistent, magnetic field of an intensity sufficient to cause a static magnetic offset in said electronic compass, said known, consistent, magnetic field having a magnetic signature;

a magnetic field sensor located in proximity to said vehicle accessory, said magnetic field sensor detecting a combination of Earth's magnetic field and said known, consistent, magnetic field and generating a magnetic field signal wherein said Earth's magnetic field is modified by said static magnetic offset;

a controller coupled to said magnetic field sensor and receiving said magnetic field signal, said controller having control logic operative to search said magnetic field signal for said magnetic signature, lookup a correction factor for said magnetic signature stored in a memory location, and apply said correction factor to said magnetic field signal; and a display coupled to said controller, said display displaying a heading unaffected by said static magnetic offset.

2. The electronic compass system using magnetic signatures to detect a vehicle event as recited in claim 1, wherein said electronic compass is integrated in an instrument cluster.

3. The electronic compass system using magnetic signatures to detect a vehicle event as recited in claim 1, wherein said vehicle accessory is located in an instrument panel.

4. The electronic compass system using magnetic signatures to detect a vehicle event as recited in claim 1, wherein said vehicle accessory is one selected from the group comprising: headlamps, tail lamps, stop lamps, a wiper motor, or a rear defrost grid.

5. The electronic compass system using magnetic signatures to detect a vehicle event as recited in claim 1, wherein the proximity of said magnetic sensor to said vehicle accessory is optimized to minimize said static magnetic offset.

6. The electronic compass system using magnetic signatures to detect a vehicle event as reciting in claim 1, wherein said static magnetic offset varies due to variation in said vehicle accessory and temperature.

7. The electronic compass system using magnetic signatures to detect a vehicle event as reciting in claim 6, wherein said controller includes control logic operative to determine a maximum positive magnetic offset of said vehicle accessory, determine a maximum negative magnetic offset of said vehicle accessory, and scale said compensation factor based upon said maximum positive and negative magnetic offsets.

8. A method for using information on a communications bus to eliminate magnetic noise in an electronic compass comprising the steps of:

generating a known, consistent, magnetic field of an intensity sufficient to cause a static magnetic offset in said electronic compass, said known, consistent, magnetic field having a magnetic signature corresponding to at least one electrical state of a vehicle accessory;

detecting a combination of Earth's magnetic field and said known, consistent, magnetic field wherein said Earth's magnetic field is modified by said static magnetic offset to generate an magnetic field signal;

receiving a magnetic field signal corresponding to said electrical state;

searching said magnetic field signal for said magnetic signature;

looking up a predetermined correction factor for said magnetic signature stored in a memory location;

applying said predetermined compensation factor, corresponding to said magnetic signature, to said magnetic field signal; and displaying a heading unaffected by said static magnetic offset.

9. The method for using information on a communications bus to eliminate magnetic noise in an electronic compass as recited in claim 8, wherein the step of generating comprises generating a known, consistent, magnetic field of an intensity sufficient to cause a static magnetic offset in said electronic compass, said known, consistent magnetic field corresponding to at least one electrical state of a vehicle accessory, said known, consistent magnetic field varying due to variation in said vehicle accessory and temperature.

10. The method for using information on a communications bus to eliminate magnetic noise in an electronic compass as recited in claim 9, further comprising the steps of:

determining a maximum positive magnetic offset of said vehicle accessory;

determining a maximum negative magnetic offset of said vehicle accessory; and scaling said compensation factor based upon said maximum and minimum magnetic offsets.

11. An electronic compass system using magnetic signatures to detect a vehicle event comprising:

a vehicle having an instrument panel an instrument cluster located in said instrument panel;

a vehicle accessory having at least one electrical state and generating a corresponding known, consistent, magnetic field of an intensity sufficient to cause a static magnetic offset in said electronic compass, said known, consistent, magnetic field having a magnetic signature;

a magnetic field sensor located in said instrument cluster and in proximity to said vehicle accessory, said magnetic field sensor detecting a combination of Earth's magnetic field and said known, consistent, magnetic field and generating a magnetic field signal wherein said Earth's magnetic field is modified by said static magnetic offset;

a controller located in said instrument cluster and coupled to said magnetic field sensor and receiving said magnetic field signal, said controller having control logic operative to search said magnetic field signal for said magnetic signature, lookup a correction factor for said magnetic signature stored in a memory location, and apply said correction factor for said magnetic field signal; and a display located in said instrument cluster and coupled to said controller, said display displaying a heading unaffected by said static magnetic offset.

12. The electronic compass system using magnetic signatures to detect a vehicle event as recited in claim 11, wherein said vehicle accessory is one selected from the group comprising: headlamps, tail lamps, stop lamps, a wiper motor, or a rear defrost grid.

13. The electronic compass system using magnetic signatures to detect a vehicle event as recited in claim 11, wherein the proximity of said magnetic sensor to said vehicle accessory is optimized to minimize said static magnetic offset.

14. The electronic compass system using magnetic signatures to detect a vehicle event as reciting in claim 11, wherein said static magnetic offset varies due to variation in said vehicle accessory and temperature.

15. The electronic compass system using magnetic signatures to detect a vehicle event as reciting in claim 14, wherein said controller includes control logic operative to determine a maximum positive magnetic offset of said vehicle accessory, determine a maximum negative magnetic offset of said vehicle accessory, and scale said compensation factor based upon said maximum positive and negative magnetic offsets.

* * * * *